June 11, 1968     J. C. BORDEN     3,387,868

MULTIPLE MEMBER JOINING ARRANGEMENT

Filed July 30, 1965

INVENTOR
JOHN C. BORDEN

BY *Sughrue, Rothwell, Mion, Zinn & Macpeak*

ATTORNEYS

United States Patent Office 3,387,868
Patented June 11, 1968

3,387,868
MULTIPLE MEMBER JOINING ARRANGEMENT
John C. Borden, Marlboro, Vt. 05344
Filed July 30, 1965, Ser. No. 476,122
1 Claim. (Cl. 287—51)

ABSTRACT OF THE DISCLOSURE

A joint for furniture or other structure is formed from at least three subdivided members extending from different angles. Each member includes at least three sets of submembers with at least two submembers in each set, both the sets and submembers being spaced from each other and parallel to each other at the joint. The submembers of each member extend through the space between the sets and submembers of the other members in physical contact at the joint to provide a large gluing surface. All the submembers of at least one member are secured together in physical contact with each other at a point remote from the joint.

---

This invention relates to improvements in joining arrangements and particularly to a multiple member, multiple submember joining arrangement.

In the joining of multiple members which connect at a common point, such as in a table leg and braces, chairs, stools and other pieces of furniture and the like, there is need for high strength at the joints, good adhesion of the joining members and the joint should have aesthetic appeal. It is the purpose of this invention to provide such a multiple member joining arrangement using a plurality of spaced submembers for each member, the submembers being arranged in multiple spaced sets, with securing means between the submembers of one member with at least two submembers of each other member in the joint.

In summary the invention accomplishes the desired result of providing a high strength joint with good adhesion and aesthetic appeal by providing at least three members having subdivisions into at least three sets of submembers each with at least two submembers. The submembers and set are both spaced from each other and parallel with each other at the joining point to provide a large contact area for securing by adhesive. The submembers of at least one of the three members are all joined together at a point remote from the joint to further apply compressive forces at the joint.

Other objects of the invention will be pointed out in the following description and claim and illustrated in the accompanying drawings, which disclose by way of example, the principle of the invention and the best mode which has been contemplated of applying that principle.

Figure 1:
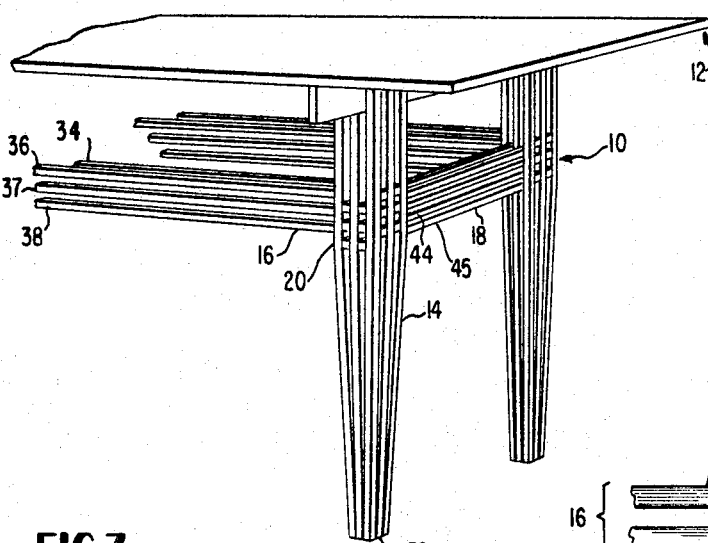
FIG. 1 is a perspective view of a portion of a table utilizing the multiple member joining arrangement of this invention.

Referring now to the drawings, a multiple member joining arrangement 10 is illustrated in FIG. 1 as appropriate for joining the legs and horizontal leg braces of a table 12. The joining arrangement includes three members 14, 16 and 18 extending toward one another at a common joint 20 and also extending through one another at the joint. In the FIG. 1 embodiment the members extend at right angles to each other.

Figure 2:
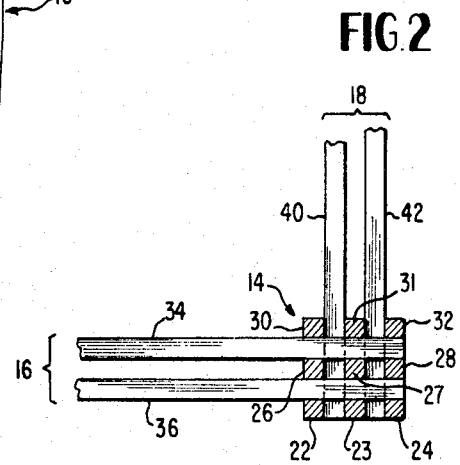
FIG. 2 is a sectional view taken through the joint of the table leg and braces illustrated in FIG. 1.

As shown in FIG. 2, member 14 is made up of three sets of three submembers each. There is a first row or set of submembers 22, 23 and 24, with each submember spaced from and parallel to each other and spaced from a second similar set of submembers 26, 27 and 28, which in turn are also spaced from each other and spaced from a third set of submembers 30, 31 and 32. The spaces between the submembers of each set and of the sets themselves is equal to the width of the submembers of members 16 and 18. That is, each of the submembers and sets of submembers are spaced apart equal to a dimension through the cross section of the submembers of the other members.

Member 16 has a set or pair of submembers 34 and 36 which are spaced from two similar pairs of submembers, including submembers 37 and 38 shown in FIG. 1. In like manner member 18 includes a set or pair of submembers 40 and 42 which are above additional sets of submembers, including submembers 44 and 45, shown in FIG. 1. The three pairs of submembers of members 16 and 18 are likewise spaced apart from one another a distance equal to the width of the other two members and the individual submembers 34 and 36 of a pair are spaced apart the width of the individual submembers.

The joint is assembled with the submembers extending through the spaces created between the spaced submembers of the other members and the horizontal submembers of members 16 and 18 lie on top of one another as shown in FIG. 1. With this arrangement, there are a great number of contact areas between the various submembers. In fact, any one submember will have at least ten contact areas. Adhesive means such as glue or the like is utilized securing these submembers where they are in physical contact. Thus, the joint of this invention provides a tremendous amount of area in physical contact allowing for presently available adhesive means to hold the joint tighter than prior art joints due to the greater adhesive area.

Figure 3:
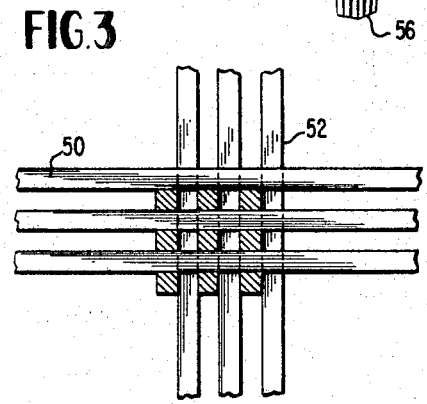
FIG. 3 is a modification of the joining arrangement of FIG. 2 using three sets of horizontal submembers.

FIG. 2 illustrates that the principles of this invention are not limited to pairs providing the sets of horizontal members such as members 16 and 18 of the FIGS. 1 and 2 embodiment. In other words, there can be three sets of submembers with three submembers in each set, making nine submembers for each member. This is illustrated in FIG. 3 by additional submembers 50 and 52 for each of the horizontal sets of submembers. In the arrangement of FIG. 2, all the members extend at right angles to one another and, therefore, the area of the submembers in cross section are square. If each of the submembers is one-half inch square, the arrangement of FIG. 3 provides 135 contact areas providing 33¾ square inches of contact area. Joints using nine submembers in each axis have a total area of contact equal to fifteen times that of the total cross sectional area of material in each main member. With this large contact area the joint is very difficult to break.

Referring back to FIG. 1 for another feature of the invention, if the submembers of any member are all pulled together and joined in contact with one another, such as at point 56 at the bottom of leg 14, this in effect will cause the submembers of member 14 to be squeezed together before entering the joint. Similarly, in FIG. 3 the submembers could be squeezed together on both sides of the joint. This causes the joint to have a strong configuration for its weight and sectional area.

Figure 4:
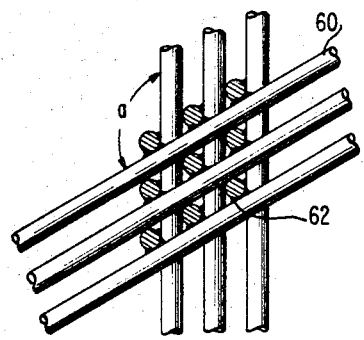
FIG. 4 is a sectional view taken through a joint similar to that shown in FIGS. 2 and 3 illustrating a further embodiment, in which the submembers are circular in section and the members do not join one another at right angles.

FIG. 4 illustrates that the invention does not need to use submembers which are square in section nor does it require wooden submembers. Further, the members do not need to extend at right angles to one another. In FIG. 4 the submembers 60 are circular in section and may be metal rods, wires or tubes. They are secured together where they are in physical contact by metal bonding means such as weld 62. Furthermore, the submembers extend at an angle $a$ to one another which is not a right angle and with the use of round submembers the members are not limited to the angle they extend to one another.

Figure 5:
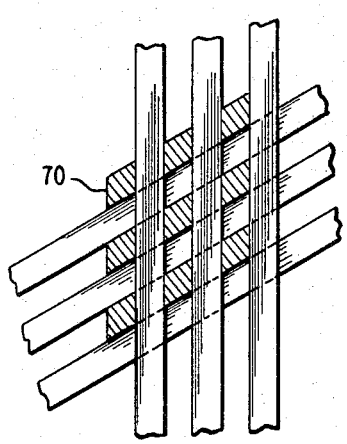
FIG. 5 is a further modification in which the members do not join one another at right angles and the submembers are parallelograms in section.

FIG. 5 further illustrates the feature that the members do not need to extend at a right angle to one another. In this embodiment, the sectional shapes of the submembers are parallelograms as shown by submember 70; the sectional shape of these submembers determines the relative axis angles.

The joint of this invention is not only extremely strong and hard to break by affording a large surface area for adhesive, it is also aesthetically quite pleasing. Although illustrated in the environment of a table leg and brace, the invention is obviously applicable to joints for other articles such as camp stools, chairs, etc.

While the invention has been particularly shown and described with reference to preferred embodiments thereof, it will be understood by those skilled in the art that the foregoing and other changes in form and details may be made therein without departing from the spirit and scope of the invention.

What is claimed is:
1. An arrangement for joining comprising;
(a) at least three subdivided members extending toward and through one another to intersect at a common joint,
(b) each member including at least three sets of submembers, with at least two submembers in each set, the submembers of each set being spaced from each other, and each set being spaced from the other set, said spaced distances being equal to a dimension through a cross section of the submembers of the other members,
(c) at least two of the submembers of each member extending through the space between the sets and submembers of the other members and each submember being in physical contact with at least eight other submembers of the other members to form the joint, the submembers of each set being parallel to each other at the joint and the sets being parallel to each other at the joint,
(d) means for securing the submembers together at the joint where they are in physical contact,
(e) and means securing all the submembers of at least one member together in physical contact with each other at a point remote from the joint.

References Cited
UNITED STATES PATENTS

| | | | |
|---|---|---|---|
| 1,066,212 | 7/1913 | Meltzer | 52—280 |
| 1,390,364 | 9/1921 | Luling et al. | 52—648 |
| 1,664,103 | 3/1928 | Bishoff | 297—446 |
| 1,770,017 | 7/1930 | Sommer | 52—660 |
| 2,040,126 | 5/1936 | Grieve | 248—188.91 XR |
| 2,444,669 | 7/1948 | Pollard et al. | 248—431 |
| 2,929,666 | 3/1960 | Miller | 248—431 XR |

CARL W. TOMLIN, *Primary Examiner.*

A. KUNDRAT, *Assistant Examiner.*